R. N. MARTZ.
COUPLING FOR HOSE AND PIPES.
APPLICATION FILED APR. 7, 1916.
1,217,041.
Patented Feb. 20, 1917.
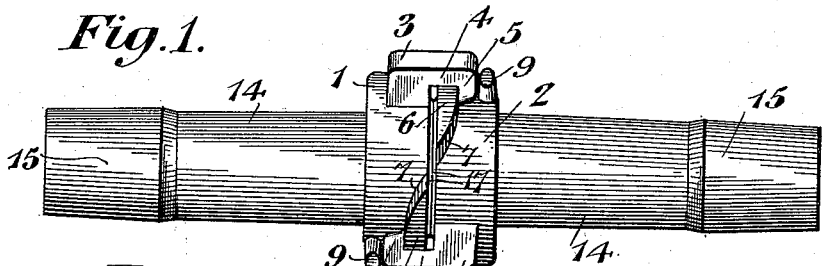
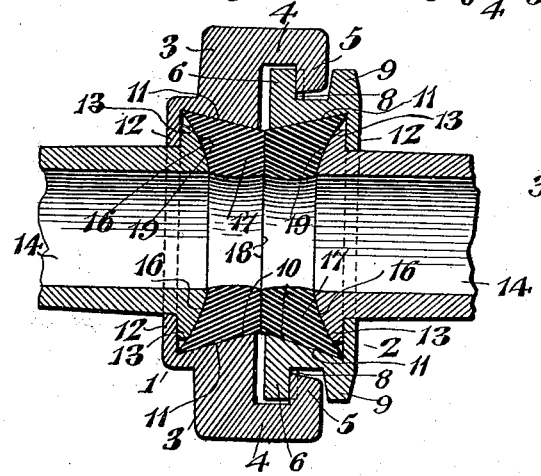
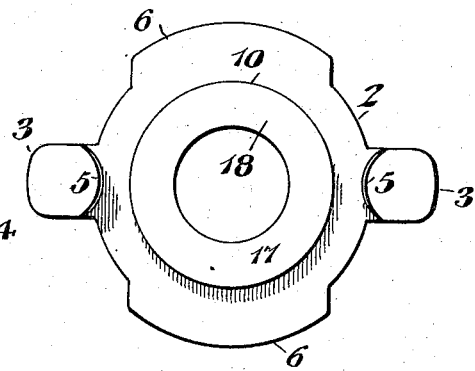
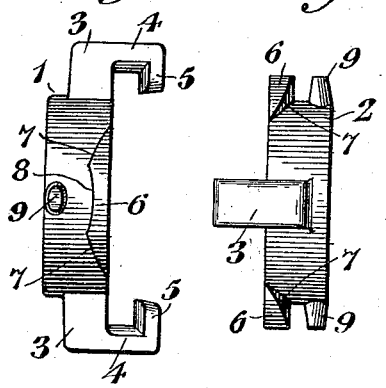
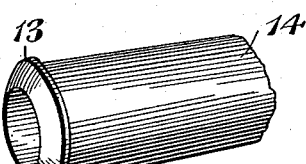
WITNESSES
Randolph N. Martz, INVENTOR
BY
ATTORNEY

UNITED STATES PATENT OFFICE.

RANDOLPH N. MARTZ, OF FREDERICK, MARYLAND.

COUPLING FOR HOSE AND PIPES.

1,217,041.     Specification of Letters Patent.     Patented Feb. 20, 1917.

Application filed April 7, 1916. Serial No. 89,730.

*To all whom it may concern:*

Be it known that I, RANDOLPH N. MARTZ, a citizen of the United States, residing at Frederick, in the county of Frederick and State of Maryland, have invented a new and useful Coupling for Hose and Pipes, of which the following is a specification.

This invention has reference to couplings for connecting sections of hose or pipe conducting air, steam or other fluid. The object of the present invention is to provide an easily manipulated device for coupling adjacent ends of hose or pipe, whereby the act of coupling causes the complete sealing of the connected ends of the hose or pipe against leakage at the coupling.

In accordance with the present invention there are provided two meeting members constructed to be united end to end by a partial rotation of one or both about the longitudinal axis of the coupling with each coupling member containing a yieldable gasket, usually of rubber, adapted to be compressed by relative approach of the coupling members on moving to the coupled position. The gaskets and the seats therefor in the two coupling members are so arranged that the compressive action in coupling causes a longitudinal and radial expansive tendency in the gaskets, forcing all engaging surfaces into particularly tight contact entirely resistant to any internal pressures to which the hose and coupling may be subjected. Moreover, the coupling is so constructed that while the necessary movements for coupling and uncoupling are provided for, the connected members are so limited in rocking movements transverse to the longitudinal axis of the coupling that leakage which might otherwise occur because of rocking movements is eliminated.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a side elevation of the coupling in the connected condition, with the coupling of a character permitting its use in connection with hose.

Fig. 2 is a longitudinal diametric section of the coupling of Fig. 1 with the terminal portions of the coupling omitted and drawn on a larger scale than Fig. 1.

Fig. 3 is an end face view of one of the coupling members.

Fig. 4 is a side elevation of one of the coupling members.

Fig. 5 is a side elevation of the other coupling member turned with relation to the showing of Fig. 4 by a quarter revolution.

Fig. 6 is a perspective view of the entering end of one of the hose receiving members.

Fig. 7 is a perspective view of one of the gaskets.

Fig. 8 is a diametric section of one of the gaskets.

The coupling comprises two heads 1 and 2, respectively, which heads are the same in construction, wherefore parts described with reference to one head are found on the other. Each head is substantially circular in outline and at diametrically opposite points has radial extensions 3 each having a tongue 4 projecting beyond the corresponding face of the head 1 or 2, as the case may be, and terminating in a lip 5 directed toward the longitudinal axis of the head to an extent which may be about equal to the radial projection of the extension 3. Projecting radially from each head 1 and 2 and extended circumferentially thereof between the radial members 3, which latter together with the tongue 4 and lip 5 each forms a hook, are ribs 6 each having the edge remote from that face of the head beyond which the radial extensions or hooks 3 project gradually increasing from the ends toward the center to constitute beveled faces 7 merging as they approach the center of the rib into a depression 8. Close to the other face of the head 1 or 2, as the case may be, and in spaced relation to the depression 8 is a stud 9.

The arrangement is such that when the two heads are placed in face to face relation with the radial extensions or hooks 3 having their lips 5 overlapping the opposite head, and when the heads are then rotated about the longitudinal axis of the coupling, the lips 5 engage the appropriate beveled faces 7 of the ribs 6, thus causing the heads to approach as they are rotated, until the depressions 8 are reached, whereupon the lips 5 seat in the depressions. The studs 9 are so spaced from the depressions 8 as to permit the entry of the lips 5 into the depressions with the studs then close to the respective lips 5, so that there can be but slight movement of the heads in the direction of the length of the longitudinal axis of the coupling. Each head has a central passage 10 therethrough expanding from the inner face of the head toward the other end thereof, thus providing a circular wall 11 flaring from the inner face of the head toward the other or outer end of the head. At the outer end of each head, that is, the end remote from what may be termed the meeting face of the head, there is an inwardly directed radial flange 12 reducing the passage through the head to a smaller diameter than at the inner end of the head. The flange 12 serves as an abutment for an outwardly directed radial flange 13 formed on one end of two tubular members 14 each appropriately enlarged at the other end, as shown at 15, or otherwise suitably formed to receive the corresponding end of a length of hose. The end 15 is to be taken as simply indicative of any suitable connection for hose or pipe, and not as confining the invention to the particular showing of the drawings in this respect. That face of the flange 13 remote from the end 15 is rounded or convex, as indicated at 16.

Adapted to and seated in the flaring part of the passage or bore 10 of each head is a gasket 17 having one end formed with a flat circular face 18 and the other end of larger diameter than the face 18 and having a circular dished face 19 conforming approximately to the shape of the face 16 of the hose-receiving member 14. The internal diameter of the gasket 17 is approximately that of the internal diameter of the hose receiving member 14.

The gasket 17 increases in diameter from the end 18 to the end 19 similarly to the flare of the wall 11, but is not necessarily conical like the wall 11, for it may be externally of concave conoidal form as shown in Figs. 7 and 8. When the hose-receiving member 14, which swivels in the corresponding head 1 or 2, is inserted so that the flange 13 rests against the flange 12, the appropriate washer 17 is introduced into the head with the end face 19 resting against the convex face 16 of the flange 13 and the outer flaring wall of the gasket then seats against the wall 11. The length of the gasket is such that the face 18 projects beyond the corresponding meeting face of the head 1 or 2, as the case may be.

When the two heads are brought together so that the faces 18 of the gaskets touch, the lips 5 pass on to the corresponding opposite heads between the radial extensions 3 and the ribs 6. Now, on turning the heads one on the other, the beveled walls 7 engaging the lips 5 draw the heads one toward the other, thereby compressing the gaskets lengthwise and causing them to bulge both on the inner and outer walls, the outer walls pressing against the walls 11, while the end walls 19 press firmly against the ends 16 of the swivel members 14. The pressure increases until the lips 5 reach the depressions 8 into which they snap due to the expansive force of the gaskets which have been compressed by the action just described. In this position the gaskets engage each other at the walls 18 with the walls 19 pressing firmly against the ends 16 of the swivel hose-receiving members 14, and the flanges 13 pressing against the flanges 12. Furthermore, the tendency to bulge the gaskets forces their peripheral surfaces into close engagement with the walls 11. Any tendency of one member of the coupling to rock on the other member beyond a very limited extent is prevented by the studs 9 engaging the lips 5.

The tendency to leak is between the flange 13 and the corresponding end of a gasket and the meeting surfaces 18 of the two gaskets. Internal pressure from fluids passing through the hose is exerted upon the gaskets forcing them into closer contact with the flaring walls 11, thus tending to seat the gaskets more intimately against the faces 16 of the swivel members 14 and against each other at the faces 18. Consequently, any tendency to leakage is overcome directly with the pressure applied, wherefore as the pressure increases the tendency to leakage, of course, correspondingly increases, but such tendency is resisted in proportion to the increased pressure. Nor do deflections of the coupling from alinement materially affect the resistance to leakage, because the studs 9 in the path of the lips 5 confine such deflections to a negligible minimum and without relieving the gaskets from pressure in any direction sufficient to admit of leakage.

What is claimed is:—

1. A hose or pipe coupling comprising two interlocking heads each with a passage therethrough internally expanded to form a seat flaring from the meeting faces of the two heads toward the other end, the passage terminating at a flange directed toward the longitudinal axis of the coupling, a tubular swivel member having a flange at one end adapted to seat in the head against the flange thereof, and a gasket for each head expanding from one end to the other in conformity with the flaring seat in the head, said gasket having the larger end dished to bear against the flange of the swivel tube, and the other end shaped to engage the corresponding end of the matching gasket, the gaskets being each of a length to project beyond the respective meeting faces of the heads for the compression of the gaskets against the flanges of the swivel tubes and against the flaring walls of the seats when the heads are locked together.

2. A pipe coupling comprising two interlocking heads with fluid conducting passages therethrough each expanding within the head from the meeting faces of the heads to provide a flaring seat, a tubular swivel member for each head having an outwardly directed flange within the head and located at the larger end of the flaring seat, and a packing gasket having a flaring outer wall adapted to the seat in the respective head with the larger end of the gasket dished to bear against the flanged end of the swiveled tube.

3. A hose or pipe coupling having interlocking heads with means for the attachment of the ends of hose or pipe thereto, each head having a unitary seat flaring from the meeting faces of the heads toward the other ends thereof, and flaring gaskets adapted to the flaring seats and each of a length to project beyond the meeting faces of the heads for engagement and compression by the interlocking of the heads, and each head having locking members and studs associated with certain of the locking members to be in the path of movement of the companion locking members of the other head to resist movements of the heads relative one to the other in the direction of the longitudinal axis of the coupling.

4. A hose or pipe coupling having interlocking heads with seats therein and packing gaskets adapted to the seats, each gasket comprising a ring flaring from one end toward the other with the end face of the smaller end of the ring plane and the end face of the larger end of the ring dished and the seats in the heads where engaged by the flaring portion of the ring and by the dished end being correspondingly shaped to the parts of the gasket engaging them.

In testimony, that I claim the foregoing as my own, I have hereto affixed my signature in the presence of two witnesses.

RANDOLPH N. MARTZ.

Witnesses:
A. Le Roy McCardell,
Wm. D. Zimmerman.

Copies of this patent may be obtained for five cents each, by addressing the "Commissioner of Patents, Washington, D. C."